United States Patent
Zhang

(10) Patent No.: US 8,180,751 B2
(45) Date of Patent: May 15, 2012

(54) USING AN ENCYCLOPEDIA TO BUILD USER PROFILES

(75) Inventor: Li Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 12/263,414

(22) Filed: Oct. 31, 2008

(65) Prior Publication Data

US 2010/0005088 A1  Jan. 7, 2010

Related U.S. Application Data

(60) Provisional application No. 61/077,472, filed on Jul. 1, 2008.

(51) Int. Cl.
*G06F 7/00* (2006.01)

(52) U.S. Cl. ........ 707/705; 707/748; 707/715; 709/204; 715/789

(58) Field of Classification Search ................... 707/705, 707/748, 715; 709/204
See application file for complete search history.

(56) References Cited

U.S. PATENT DOCUMENTS

2006/0129538 A1* 6/2006 Baader et al. ..................... 707/3
2007/0233656 A1* 10/2007 Bunescu et al. .................. 707/3

* cited by examiner

*Primary Examiner* — Don Wong
*Assistant Examiner* — Tuan-Khanh Phan

(57) ABSTRACT

Described are various embodiments which enable organizations to track and use knowledge and expertise of their associated individuals. An organization can use exemplary embodiments to automatically summarize the expertise of each individual from documents available from internal or external web sites. For example, a web crawler crawls a computer network to identify documents that name an individual. Summaries of the documents are generated based on articles in an encyclopedia, and a profile is built of the individual using the summaries. These summaries are used for automatically searching and automatically discovering individuals having particular knowledge or expertise on certain topics and subjects.

22 Claims, 2 Drawing Sheets

USING AN ENCYCLOPEDIA TO BUILD USER PROFILES

CROSS-REFERENCE TO RELATED APPLICATION

The present application claims priority from provisional application Ser. No. 61/077,472, filed Jul. 1, 2008, the contents of which are incorporated herein by reference in their entirety.

BACKGROUND

Knowledge and expertise of individuals (e.g. employees) in an organization (e.g. a company) are valuable resources. Organizations often desire to track and use this knowledge and expertise for efficient planning, operation, and organization. Retrieving, storing, and searching these resources, however, are difficult tasks.

To perform these tasks, one solution is to define an ontology of skills relevant to the organization and then request individuals to report their skills according to the ontology. This solution is subject to problems since the ontology is difficult to define and keep current, and users are burdened with manually reporting and updating their knowledge and skills.

Another solution is to use natural language processing tools to discover expertise of individuals. Such tools are error prone and usually produce a large number of terms that require human review.

DETAILED DESCRIPTION

Exemplary embodiments of the present invention are directed to systems, methods, and apparatus for building user profiles and identifying users with a particular knowledge or expertise. One or more encyclopedias or knowledge bases are used to build the user profiles and locate individuals having certain knowledge or expertise.

Exemplary embodiments enable organizations to track and use knowledge and expertise of their associated individuals for efficient planning, operation, and organization. For example, a company or organization can use exemplary embodiments to automatically summarize the expertise of each employee from documents available from internal or external web sites. These summaries are used for searching and discovering individuals having particular knowledge or expertise on certain topics and subjects.

In one embodiment, web pages (such as internal web pages of a company) are crawled to collect documents associated with individuals. Particular names in the documents are identified and text surrounding a name is segmented or extracted. The segmented section of text is then summarized using an electronic encyclopedia to form name and subject pairs for each document. These pairs are aggregated for each individual to build a user profile. The profiles or aggregated pairs are stored in a database. This database is then consulted or searched in response to receiving queries or searches for individuals with particular knowledge or expertise. Exemplary embodiments thus enable companies to identify experts and use knowledge of individuals as a resource.

Exemplary embodiments map segments of each document to one or more articles in an electronic encyclopedia. Once a match is found between a text segment and an article, the title of the article is used to represent the text segment and provide a summary. In other words, the title of the encyclopedia article provides the actual summary of the text segment (as opposed to, for example, extracting key words from the text segment to generate the summary). The title of the article provides an accurate semantic connection with the substance or context of the text segment.

Figure 1:
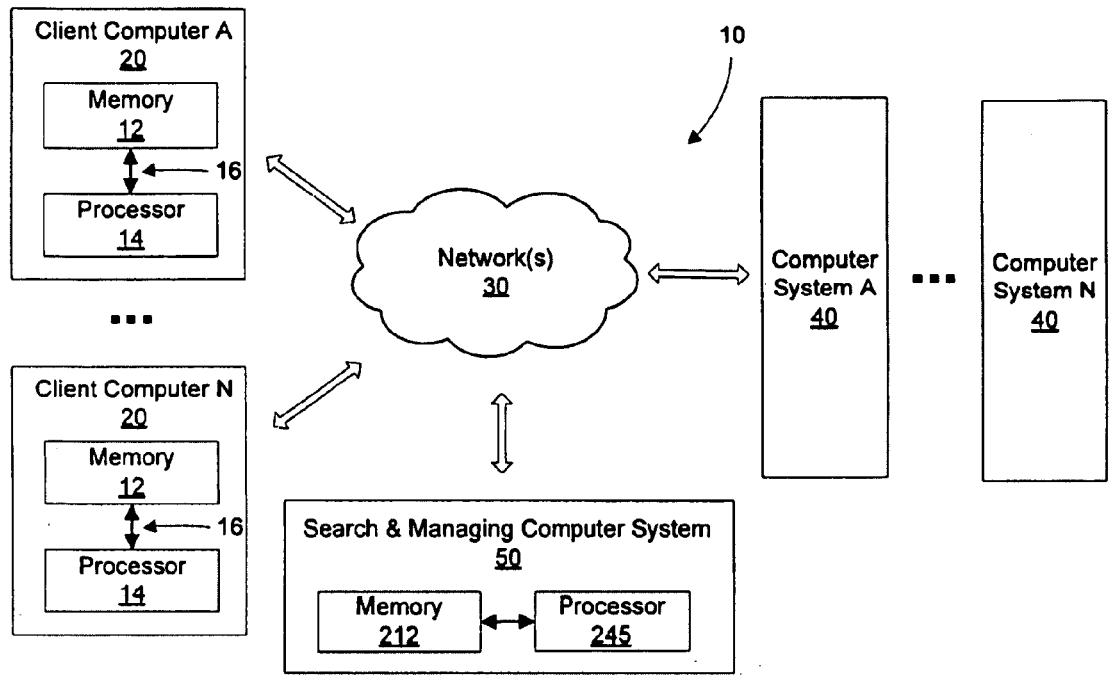
FIG. 1 illustrates a computer network in accordance with an exemplary embodiment of the present invention.

FIG. 1 illustrates an exemplary system or data processing network 10 in which exemplary embodiments are practiced. The data processing network includes a plurality of computing devices 20 (such as client computers or workstations) in communication with one or more networks 30 that are in communication with one or more computer systems 40 and a search and managing computer system 50 (shown in more detail in FIG. 2).

For convenience of illustration, only a few computing devices 20 are illustrated and shown as client computer A to client computer N. The computing devices include a memory 12, processor 14, and bus 16 interconnecting various components. Exemplary embodiments are not limited to any particular type of computing device since various portable and non-portable computers and/or electronic devices may be utilized. Exemplary computing devices include, but are not limited to, computers (portable and non-portable), laptops, notebooks, servers, workstations, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

The network 30 is not limited to any particular type of network or networks. The network 30, for example, can include one or more of a local area network (LAN), a wide area network (WAN), the Internet, an extranet, or an intranet, to name a few examples.

The computer systems 40 are not limited to any particular type of computer or computer system and are shown as computer system A to computer system N. The computer system 40 may include personal computers, mainframe computers, servers (such as web servers, application servers, database servers, etc.), databases, and gateway computers, to name a few examples.

Figure 2:
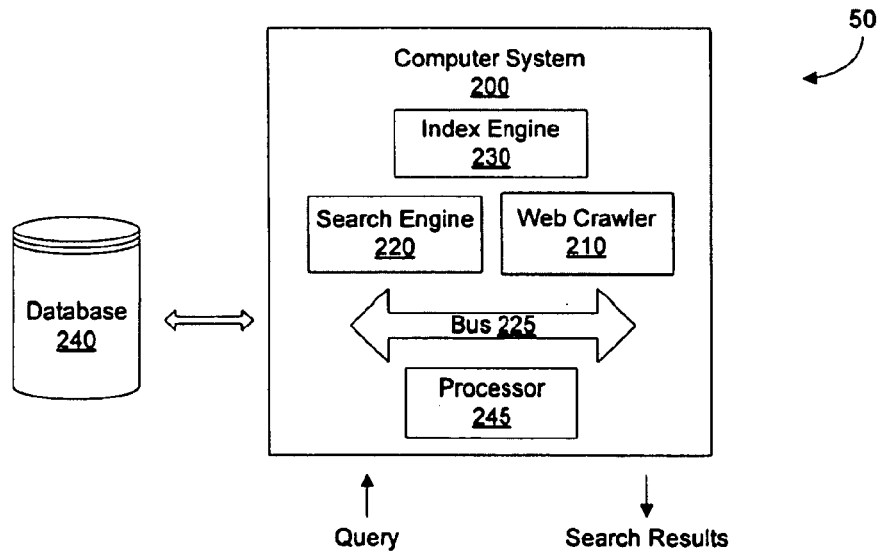
FIG. 2 illustrates a search and managing computer system in accordance with an exemplary embodiment of the present invention.

The search and managing computer system 50 is discussed in more detail in FIG. 2 and is shown to include memory 212 coupled to a processor 245.

Those skilled in the art will appreciate that the computing devices 20, computer systems 40, and search and managing computer system 50 connect to each other and/or the network 30 with various configurations. Examples of these configurations include, but are not limited to, wireline connections or wireless connections utilizing various media such as modems, cable connections, telephone lines, DSL, satellite, LAN cards, and cellular modems, just to name a few examples. Further, the connections can employ various protocols known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital communication networks are also applicable. Such networks include, but are not limited to, a digital telephony network, a digital television network, or a digital cable network, to name a few examples. Further yet, although FIG. 1 shows one exemplary data processing network, exemplary embodiments can utilize various computer/network architectures.

For convenience of illustration, an exemplary embodiment is illustrated in conjunction with a search engine and web crawler. This illustration, however, is not meant to limit embodiments with search engines and web crawlers. Further, exemplary embodiments do not require a specific search engine or web crawler. The search engine and web crawler can be any kind of search engine or web crawler now known or later developed. For example, exemplary embodiments are used in conjunction with existing search engines (such as Google's PageRank and variations thereof) or search engines developed in the future.

FIG. 2 illustrates an exemplary search and managing computer system 50 that includes a computer system 200 coupled to or in communication with a database or repository 240. The computer system 200 includes a web crawler 210, a search engine 220, an index engine 230, a processor 245, and bus 225. As one example, the search engine 220, web crawler 210, and index engine 230 are programs stored in the memory 212 (shown in FIG. 1) of the computer system 200.

The search engine enables a user to request information or media content having specific criteria. The request, for example, can be entered as keywords or a query. Upon receiving the query, the search engine 220 retrieves documents, files, or information relevant to the query and provides search results to a user or requesting computer.

The web crawler 210 crawls or searches the network and builds an associated database 240. The web crawler 210 is a program that browses or crawls networks, such as the internet or an intranet, in a methodical and automated manner in order to collect or retrieve data for storage. For example, the web crawler can keep a copy of all visited web pages and indexes and retain information or documents from the pages. This information is stored in the database 240. Typically, the web crawler traverses from link to link (i.e., visits uniform resource locators, URLs) to gather information and identify hyperlinks in web pages for successive crawling.

One skilled in the art will appreciate that numerous techniques can be used to crawl a network, and exemplary embodiments are not limited to any particular web crawler or any particular technique. As one example, when web pages are encountered, the code comprising each web page (e.g., HyperText Markup Language or HTML code) is parsed to record its links and other page information (example, words, title, description, etc.). A listing is constructed containing an identifier (example, web page identifier) for all links of a web page. Each link is associated with a particular identifier. The listing is sorted using techniques known in the art to distinguish the web pages and respective links. The relationship of links to the parsed web pages and the order of the links within a web site are maintained. After sufficient web sites have been crawled, the recorded or retrieved information is stored in the database 240.

The index engine 230 retrieves downloaded content (such as one or more electronic encyclopedias) and indexes all articles in the content. The index engine recognizes spurious articles and uses a weighting function to separate the articles. For example, the index engine 230 computes a ranking for each article by using a link analysis algorithm for a link structure among the encyclopedia articles to score or weigh the articles. The index engine also retrieves articles that are most similar to text segments extracted or appearing in articles from the encyclopedia.

In one embodiment, the output of the ranking is a score associated with each web page to indicate its importance. Alternatively, if keywords are searched, this score is used to help determine the order of the list of relevant pages.

A link analysis algorithm assigns a numerical weighting to each element of a hyperlinked set of documents, such as can be found on the World Wide Web, with the purpose of measuring its relative importance within the set based on criteria. An example of such a link analysis algorithm is Google's PageRank which assigns numerical weight to given elements of any collection of entities with reciprocal quotations and references.

As discussed in more detail in connection with FIG. 3, the database 240 is built or created with user profiles. Once the database is created, the search engine 220 can process search queries and provide search results (such as queries discussed in connection with FIG. 4). One skilled in the art will appreciate that numerous techniques can be used to process search queries and provide search results, and exemplary embodiments can be utilized with various techniques.

Figure 3:
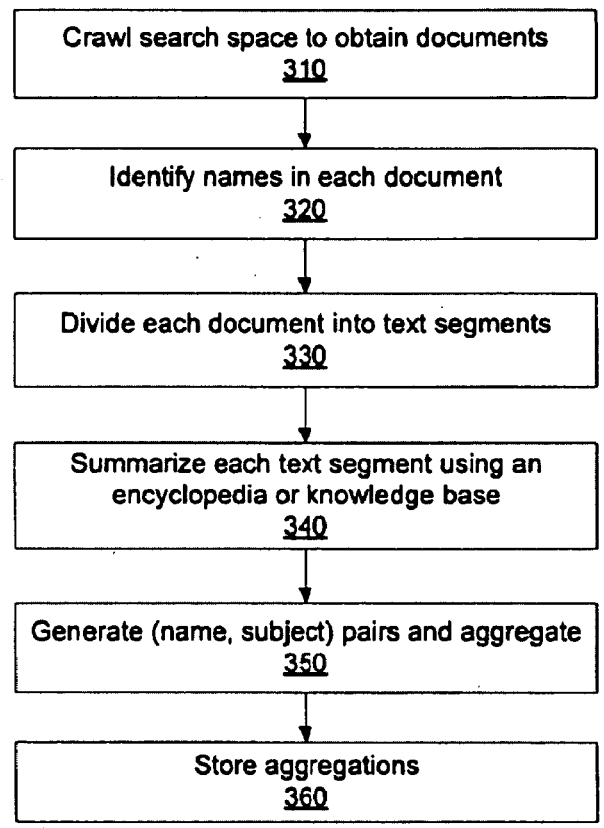
FIG. 3 illustrates a flow diagram for building user profiles in accordance with an exemplary embodiment of the present invention.

FIG. 3 illustrates a flow diagram for building user profiles in accordance with an exemplary embodiment.

According to block 310, a search space is crawled to obtain documents (for example, using the web crawler 210 of FIG. 2). For example, an internal web site of a company or organization is crawled to obtain a collection of documents that are parsed in a text format. The search space includes, but is not limited to, the internet, an intranet, an extranet, computer networks (public or private) that use internet protocols to share information, databases, knowledge repositories, etc.

In one exemplary embodiment, the crawling is performed by starting from a small number of internal seed sites. In one embodiment for example, the internal seed is the set of sites a crawler starts with, e.g. a portal page of a company. Documents at the web sites are extracted and/or searched. Such documents include, but are not limited to, documents with various formats such as HTML (Hyper Text Markup Language), formats using word processors (such as Word), formats using presentation programs (such as Powerpoint), PDF (Portable Document Format), postscript, etc. Such documents are collected and parsed into text format.

The documents can originate from a variety of sources, such as knowledge bases and document sharing systems. Exemplary embodiments attempt to obtain as many relevant documents as possible.

According to block 320, names are identified in each document. For example, one embodiment discovers and identifies names of employees of a company. The names can be obtained from a company directory, employee database, or other location.

In one exemplary embodiment, a program scans each document and identifies employee names. This step uses a list of employee names. A scoring rule is used to resolve conflicts and to remove false positives. In addition, the names are disambiguated with the aid of the company organizational structure.

According to block 330, each document is divided into text segments. For example, each document is divided or segmented into small text segments. Segments can begin and start at employee names, paragraphs, or sentence breaks.

In one embodiment, for each document that includes one or more employee names, the document is broken down into segments at the employee names. When several names are close to each other, they are formed into blocks. Segmentation is then performed at those blocks. When a segment is still too long, it is further divided into segments at natural breaks such as paragraphs or sentence breaks.

By way of example, segments are sized to include about 100 words. Each segment is associated with some names, called anchor names, found in the document. The anchor names are determined by the vicinity between the segments and the names. One exemplary embodiment associates with each segment the closest names before and after the segment.

According to block 340, each text segment is summarized using an encyclopedia or knowledge base (for example, using the index engine 230 of FIG. 2). For example, each segment is summarized by using an encyclopedia (such as Wikipedia) to form (name, subject) pairs from each document.

During a preprocessing phase, one exemplary embodiment downloads Wikipedia, or any other electronic encyclopedia collection, and indexes all the articles in the electronic encyclopedia. By way of example, the indexing is performed by any index engine with one or more of the following properties: The index engine recognizes spurious articles (or spams) and uses a weighting function that favors specialty articles.

One exemplary embodiment uses an open source index engine that computes a ranking of each article according to the link structure among the electronic encyclopedia articles. An article with higher ranking is favored in the index engine. This favoring assists in filtering or eliminating spam or spurious results.

In one embodiment, the weighting function favors articles with medium size to assist in filtering out or eliminating spurious short articles. This weighting function also filters out common articles that are unusually long in size.

Each text segment is submitted to the index engine to retrieve the top articles that are most similar to the subject matter, contents, and/or context of the text segment. How the similarity is measured varies from different index engines. In one exemplary embodiment, the similarity is determined by the number of keywords and terms common to the segment and the articles in the Wikipedia repository. A similarity score is further combined with the aforementioned weighting functions to produce the top matches to each segment. The title, called Wikipedia concept, of each top match is used as the summary of the text segment.

According to block 350, name and subject pairs are generated and aggregated. One embodiment aggregates all the (name, subject) pairs to construct an expertise database between employees and subjects.

One exemplary embodiment generates multiple pairs of employee and Wikipedia concept. These pairs are further aggregated and filtered to form the employee expertise database. The aggregation is performed in such a way that the weights of pairs from different sources, such as different document or host, are more valued. The filtering is by removing the pairs with low combined term frequency and inverse document frequency (TFIDF) score.

In one embodiment, TFIDF is a term often used in machine learning, data mining community. TF (term frequency) is the number of times a keyword appearing in a document, and it indicates the relevance between a document and a keyword. DF (document frequency) is the number of documents in the entire corpus that contain certain keyword. It indicates how common a word is. A keyword has high relevance to a document when the keyword appears many times in the document (high TF and appears low in other documents (low DF)). TFIDF is a combination between TF and I/DF (inversed DF) as an indication of the relevance. There are many ways to combine them. For example, one can do TF*IDF, TF*sqrt (IDF), or TF*log(IDF), or log(TF*IDF+1).

According to block 360, the aggregations are stored. For example, the aggregations are stored in a database.

In one embodiment, the search space is continuously crawled to maintain an up to date and accurate database for searching individuals with particular knowledge or expertise. Searching is accurate since the encyclopedia article provides semantic meaning of its title and therefore enables searches on related subjects. Preferably, the encyclopedia uses data that is complete, authoritative, and current or up-to-date.

Using Wikipedia as an example, this repository has several million articles. In one embodiment, these articles are downloaded, stored, and indexed. A text similarity is performed between the words occurring in the Wikipedia articles and the words occurring in each of the text segments. For example, a count is conducted for a frequency or occurrence of words in both sources to obtain two vectors. Once a similarity is determined, the title of the Wikipedia article (not the content of the article itself) is used as the summary for the text segment. This title provides an accurate summary of the text segment since the title provides a semantic match with the segment and functions as a filter to eliminate extraneous or unrelated topics.

Figure 4:
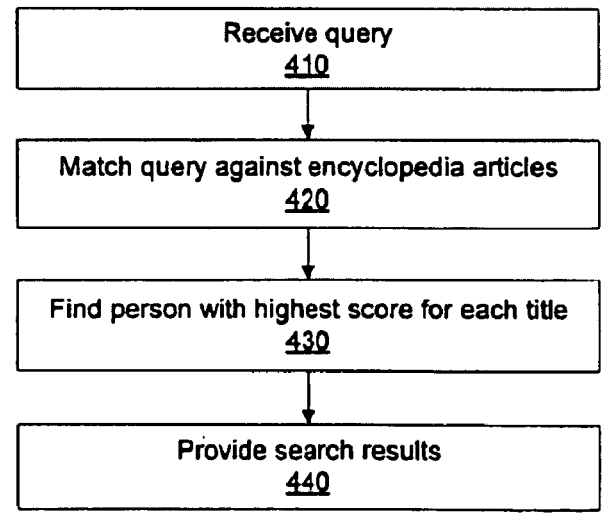
FIG. 4 illustrates a flow diagram for searching the user profiles in accordance with an exemplary embodiment of the present invention.

FIG. 4 illustrates a flow diagram for searching user profiles or responding to queries in accordance with an exemplary embodiment.

According to block 410, a query is received (for example, a query being received to the computer system 200 of FIG. 2). For example, a user enters search terms (such as keywords) and submits the terms as a query. A user can be searching for an individual—with a particular skill set, expertise, or knowledge.

According to block 420, the query is matched with the encyclopedia articles. In other words, the search terms are compared with the full text of the encyclopedia articles to determine which articles are similar or match the search terms. For instance, key words in the search are compared with a repository of Wikipedia articles to determine which articles discuss the topic or are most relevant to the key words.

According to block 430, match the person with the highest score for each article retrieved or matched with the articles in the repository. Here, the titles of the articles discovered in block 420 are matched with the title of the articles stored or associated with the text segments and individuals previously obtained to build the user profiles. For instance, assume that the query is matched with encyclopedia articles 1 through 5. Each of these articles includes a title (titles 1 through 5). These titles are searched in the user profiles to determine which user or users also have one or more of these titles associated with text segments. Expert A, for example, may have articles 1 through 4 associated with his or her user profile, and expert B may have articles 2 and 5 associated with his or her profile. Since expert A has more articles matching the query (i.e., a higher score) expert A is deemed to be a more relevant expert than expert B.

According to block 440, the search results are provided to the user who entered the search terms (for example, search results being output from the computer system 200 of FIG. 2). Continuing with the example provided above, the name and expertise of expert A is provided to the user. By way of example, such information can be displayed, emailed, sent via text, printed, stored, etc.

If more than one individual is discovered, then the retrieved names of individuals are ranked according to relevancy (for example, by the number of documents that both match the query and contain the name of the individual). The search results are presented, for example, in a graphical user interface (GUI) so users can expand each result to obtain more information. For instance, the user is presented with hyperlinks to obtain more information on the individual, the subject of the search, publications or documents that the individual has authored, a biography of the individual, etc.

As used herein and in the claims, the following words are defined as follows:

The term "document" means a writing that provides information or acts as a record of events or arrangements. By way of example, "documents" include, but are not limited to, electronic files (data files, text files, program files, etc.), stored information (such as information stored in a database or memory), text, computer files created with an application program, websites, images, emails, publications, and other writings.

The word "Wikipedia" means an open content encyclopedia that is accessible through the internet.

The word "encyclopedia" means a work that contains information on various branches of knowledge or treats comprehensively a particular branch of knowledge usually in articles or documents arranged by subject.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps can be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein (such as being implemented in a server or controller). The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known tangible storage media such as memory. Such media can be used with a data processing system or in any type of memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in tangible physical memory or media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   crawling a computer network to identify documents that name an individual;
   generating, by a system having a processor, summaries of the documents with articles in an encyclopedia;
   building, by the system, a profile of the individual with the summaries; and
   searching the profile to provide responses to search queries.

2. The method of claim 1 further comprising, determining a similarity between context of the documents and context of the articles in the encyclopedia, wherein generating the summaries is based on the determined similarity.

3. The method of claim 1, wherein the summaries are generated from titles of the articles in the encyclopedia.

4. The method of claim 1 further comprising:
   dividing each of the documents into segments;
   comparing keywords in the segments with words in the articles to determine which articles are similar to the segments;
   summarizing the segments with content from articles in the encyclopedia that are similar to the segments.

5. The method of claim 1 further comprising:
   downloading the encyclopedia from an internet;
   further crawling the internet to retrieve updates for the encyclopedia.

6. The method of claim 1 further comprising:
   computing a ranking of each of the articles in the encyclopedia using a link analysis algorithm;
   providing a higher weight to articles with higher rankings to filter out spam articles.

7. The method of claim 1 further comprising:
   aggregating names of individuals with titles of articles from the encyclopedia to construct a database;
   searching the database for individuals with a specific expertise.

8. A tangible computer readable storage medium having instructions for causing a computer to execute a method, comprising:
   identifying documents that include a name of an individual;
   comparing the documents with articles in an encyclopedia;
   summarizing the documents with content from the articles in the encyclopedia to build a user profile of the individual; and
   using the user profile to respond to search queries.

9. The tangible computer readable storage medium of claim 8 further comprising, using titles of the articles in the encyclopedia to provide summaries for the documents.

10. The tangible computer readable storage medium of claim 8, wherein the instructions are for causing the computer to further perform:
 receiving a search query with search terms;
 comparing the search terms with the content from the articles in the user profile to determine a similarity between the search terms and the content;
 using the similarity to determine whether the user profile matches the search terms.

11. The tangible computer readable storage medium of claim 8, wherein the instructions are for causing the computer to further perform:
 downloading the encyclopedia from an internet;
 indexing articles from the encyclopedia to remove spurious articles and provide a higher weighting function to longer articles than shorter articles.

12. The tangible computer readable storage medium of claim 8, wherein the instructions are for causing the computer to further perform:
 dividing the documents into segments at locations where the name of the individual occurs;
 summarizing each of the segments with titles of articles from the encyclopedia to build the user profile.

13. The tangible computer readable storage medium of claim 8, wherein the instructions are for causing the computer to further perform:
 receiving a search request to locate a person with an expertise;
 comparing the search request with the articles in the encyclopedia to determine relevant articles;
 comparing the relevant articles with the user profile to determine if the individual has the expertise.

14. The tangible computer readable storage medium of claim 8, wherein the instructions are for causing the computer to further perform, building the user profile from content in the articles of the encyclopedia.

15. The tangible computer readable storage medium of claim 8, wherein the instructions are for causing the computer to further perform:
 pairing names of employees with summaries of the articles in the encyclopedia to build a database;
 searching the database to find employees with particular knowledge and expertise.

16. A computer system, comprising:
 a memory storing an algorithm; and
 a processor to execute the algorithm to:
  crawl a computer network to identify documents that name individuals;
  use articles in an encyclopedia to generate summaries of the documents;
  build profiles of the individuals with the summaries; and
  search the profiles to provide responses to queries.

17. The computer system of claim 16, wherein the encyclopedia is Wikipedia.

18. The computer system of claim 16, wherein the processor is to further execute the algorithm to:
 divide each of the documents into segments;
 summarize each of the segments with a title of an article from the encyclopedia.

19. The computer system of claim 16, wherein the processor is to further execute the algorithm to:
 compare articles in the encyclopedia with words in a search query to determine relevant articles;
 compare the relevant articles with the profiles to find an expert.

20. The computer system of claim 16 further comprising, an index engine to index the articles in the encyclopedia, recognize spurious articles, and remove articles that are similar to terms in segments of the documents.

21. The tangible computer readable storage medium of claim 8, wherein the summarizing is based on the comparing.

22. A method, comprising:
 crawling a computer network to identify document segments that name an individual;
 comparing content in the document segments with content in articles of an encyclopedia to determine which articles are similar to the respective document segments;
 generating, by a system having a processor, a corresponding summary of each of the document segments, wherein the corresponding summary includes a concept from at least one of the articles of the encyclopedia determined to be similar to the respective document segment;
 building, by the system, a profile of the individual, where the profile includes information in the summaries; and
 searching the profile to provide responses to search queries.

* * * * *